United States Patent
Lukovic (10) Patent No.: US 10,714,917 B2
(45) Date of Patent: Jul. 14, 2020

(54) SPLICE PLATE FOR CONNECTING CABLE BUS ENCLOSURES

(71) Applicant: Advanced Cable Bus, Inc., Greenville, SC (US)

(72) Inventor: Andre Lukovic, Greenville, SC (US)

(73) Assignee: ADVANCED CABLE BUS, INC., Greenville, SC (US)

( * ) Notice: Subject to any disclaimer, the term of this patent is extended or adjusted under 35 U.S.C. 154(b) by 0 days.

(21) Appl. No.: 16/722,937

(22) Filed: Dec. 20, 2019

(65) Prior Publication Data

US 2020/0127450 A1    Apr. 23, 2020

Related U.S. Application Data

(63) Continuation of application No. 16/148,689, filed on Oct. 1, 2018, now Pat. No. 10,547,162.

(51) Int. Cl.
*H02G 3/06* (2006.01)
*H02G 3/04* (2006.01)

(52) U.S. Cl.
CPC ......... *H02G 3/0608* (2013.01); *H02G 3/0437* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,972,857 A | * | 2/1961 | Bodman | B66C 13/12 59/78.1 |
| 3,022,972 A | * | 2/1962 | Bunston | H02G 3/0608 248/68.1 |
| 3,448,953 A | * | 6/1969 | Kurlandsky | F16G 13/16 248/51 |
| 3,504,864 A | * | 4/1970 | Kurlandsky | F16G 13/16 248/51 |
| 3,662,805 A | * | 5/1972 | Sygnator | F16B 5/01 411/103 |
| 3,811,151 A | * | 5/1974 | Kuemmerlin | E06C 1/32 16/329 |

(Continued)

*Primary Examiner* — Binh B Tran
*Assistant Examiner* — Krystal Robinson
(74) *Attorney, Agent, or Firm* — Kim and Lahey Law Firm, LLC; Seann P. Lahey (57) ABSTRACT

A splice plate for adjustable angled connections between adjacent sections of cable bus enclosures having a first portion for adjustably connecting to a first siderail of a first cable bus enclosure, and a second portion for connecting to a second siderail of an adjacent second cable bus enclosure; at least one straight slot included in said first portion for receiving a connecting bolt to interconnect said first siderail and said plate, wherein a position of said connecting bolt within said straight slot is movable to allow changes of connection angle; at least one arc slot included in said first portion for receiving connecting bolts to interconnect said first siderail and said plate, wherein a position of said connecting bolts within said arc slot is movable to allow changes of connection angle in cooperation with said straight slot; whereby an angle of connection between said first and second cable bus enclosures is selectively adjustable by changing the position of said connecting bolts in said slots on said first portion of said plate.

15 Claims, 4 Drawing Sheets

(56) References Cited

U.S. PATENT DOCUMENTS

| | | | | |
|---|---|---|---|---|
| 3,848,407 A * | 11/1974 | Moritz | F16G 13/16 | 59/78.1 |
| 3,921,388 A * | 11/1975 | Loos | F16G 13/16 | 59/78.1 |
| 4,159,758 A * | 7/1979 | Courson | B66B 23/22 | 198/335 |
| 4,311,293 A * | 1/1982 | Tenniswood | F16G 13/16 | 248/49 |
| 4,647,884 A * | 3/1987 | Lang | H01P 3/14 | 333/248 |
| 4,666,327 A * | 5/1987 | Su | E06C 1/32 | 16/324 |
| 4,842,098 A * | 6/1989 | Yuen | E06C 1/32 | 16/351 |
| 5,279,387 A * | 1/1994 | Swiderski | E06C 1/32 | 182/108 |
| 5,639,048 A * | 6/1997 | Bartholomew | F16L 3/26 | 248/49 |
| 5,917,982 A * | 6/1999 | Vargas | G02B 6/4459 | 385/134 |
| 6,349,534 B1 * | 2/2002 | Zanolla | F16G 13/16 | 248/49 |
| 6,681,538 B1 * | 1/2004 | Sarkisian | E04B 1/2403 | 52/289 |
| 9,255,403 B1 * | 2/2016 | Lehane | E04B 9/067 | |
| 9,464,689 B2 * | 10/2016 | Hermey | H02G 3/0468 | |
| 9,540,801 B2 * | 1/2017 | Hill | E04B 1/40 | |
| 9,625,669 B2 * | 4/2017 | Tally | H02G 3/0608 | |
| 2010/0086348 A1 * | 4/2010 | Funahashi | H02G 3/0456 | 403/306 |
| 2010/0133390 A1 * | 6/2010 | Lange | H02G 3/0418 | 248/65 |
| 2010/0272505 A1 * | 10/2010 | Daniel | E04H 12/187 | 403/306 |
| 2011/0013978 A1 * | 1/2011 | Smith | H02G 3/0608 | 403/306 |
| 2012/0312761 A1 * | 12/2012 | White | H02G 3/0608 | 211/13.1 |
| 2013/0148340 A1 * | 6/2013 | Shen | F21V 14/02 | 362/184 |
| 2014/0224515 A1 * | 8/2014 | Rouleau | H02G 3/0443 | 174/43 |
| 2015/0322987 A1 * | 11/2015 | Romano | F16L 3/26 | 248/49 |
| 2017/0268757 A1 * | 9/2017 | Christ | F16B 5/0225 | |
| 2019/0089141 A1 * | 3/2019 | Combes | H02G 3/0456 | |
| 2019/0167461 A1 * | 6/2019 | Turconi | A61F 5/0102 | |

* cited by examiner

SPLICE PLATE FOR CONNECTING CABLE BUS ENCLOSURES

BACKGROUND OF THE INVENTION

1) Field of the Invention

The present invention relates to cable bus enclosures for routing power cables, and more particularly, to a splice plate for adjustable angled connections between adjacent sections of cable bus enclosures to facilitate adaptability of cable bus enclosures during installation.

2) Description of Related Art

A cable bus is a system for distributing power from one electrical apparatus to another using insulated power cables inside of a protective metal housing. The cable bus enclosure system is comprised of a series of interconnected sections designed to support the insulated power cables to prevent damage that can lead to short circuits or other failures of the insulated power cables.

The insulated power cables carried by the cable bus enclosures are of a type that deliver large amounts of electrical power for use within power generation and industrial plants for service entrances, main feeders, distribution applications, and retrofits for existing power systems. Typical applications include connections between transformers and switchgear, tie connections between two pieces of switchgear, between motor control centers and large motors, or between generators and generator breakers or generator step-up transformers. Each cable bus system is custom designed and manufactured to meet specific on-site requirements. Nevertheless, adjustments and flexibility during the installation of the system are needed to accommodate unexpected changes in the layout and routing of the cable bus system.

Splice plates are used to join adjacent sections of cable bus enclosures and are important to the overall structural integrity, reliability, flexibility, and safety of the entire cable bus system. The prior art teaches using two plates on each side of an enclosure, four plates in total, in which the two plates on each side are joined at a single pivot point by a single bolt. Thus, a total of two bolts form the pivot point between adjacent cable bus enclosures. This arrangement allow for over-extension of the connecting angles between sections as there is nothing to limit the connection angle between the splice plates and the cable bus enclosures during installation, which can lead to damaged power cables. Further, the splice plates known in the prior art creates too wide of a gap between adjacent cable bus enclosures, making it much harder to support the cables properly and creates further stress on the two pivot bolt securing the splice plates and sections together. The splice plates known in the prior art are harder to secure at a desired angle and can loosen over time and fail to hold the enclosures in the desired angled orientation.

Accordingly, it is an object of the present invention to provide a single splice plate on each side of a cable bus enclosure allowing for selectively adjustable angled connections along a vertical orientation that is more compact, rigid, and with limited adjustment angle to prevent over-extension of power cables during installation.

It is a further object of the present invention to provide a single splice plate on each side of a cable bus enclosure allowing for selectively adjustable angled connections along both a vertical and horizontal orientation that is more compact, rigid, and with limited adjustment angle to prevent over-extension of power cables during installation.

SUMMARY OF THE INVENTION

The above objectives are accomplished according to the present invention by providing a splice plate for adjustable angled connections between adjacent sections of cable bus enclosures, said splice plate comprising a first portion for adjustably connecting to a first siderail of a first cable bus enclosure, and a second portion for adjustably connecting to a second siderail of an adjacent second cable bus enclosure; a first straight slot included in said first portion for receiving a connecting bolt to interconnect said first siderail and said plate, wherein a position of said connecting bolt within said first straight slot is movable to allow changes of connection angle between said first and second siderails; a first pair of arc slots included in said first portion for receiving connecting bolts to interconnect said first siderail and said plate, wherein a position of said connecting bolts within said first pair of arc slots is movable to allow changes of connection angle between said first and second siderails; a second straight slot included in said second portion for receiving a connecting bolt to interconnect said second siderail and said plate, wherein a position of said connecting bolt within said second straight slot is movable to allow changes of connection angle between said first and second siderails; a second pair of arc slots included in said second portion for receiving connecting bolts to interconnect said second siderail and said plate, wherein a position of said connecting bolts within said second pair of arc slots is movable to allow changes of connection angle between said first and second siderails; whereby an angle of connection between said first and second cable bus enclosures is selectively adjustable by changing the position of said connecting bolts in said slots on at least one of said first and second portions of said plate.

In a further advantageous embodiment, said first and second straight slots extend perpendicular to a central horizontal axis of said plate with a midpoint of said first and second straight slots located along said central horizontal axis, and said first and second straight slots being offset from a central vertical axis of said plate.

In a further advantageous embodiment, said first pair of arc slots include an upper arc slot disposed above said first straight slot, and a lower arc slot disposed below said first straight slot.

In a further advantageous embodiment, said slots cooperate to allow for movement of said connecting bolts in said slots such that raising the angle of connection raises the position of said connecting bolts in each of said slots on at least one of said first and second portion, and lowering the angle of connection lowers the position of said connecting bolts in each of said slots on at least one of said first and second portion.

In a further advantageous embodiment, said first pair of arc slots have a constant radius of curvature.

In a further advantageous embodiment, said second pair of arc slots have a constant radius of curvature.

In a further advantageous embodiment, said first pair of arc slots are concentric to a center point of said plate.

In a further advantageous embodiment, said second pair of arc slots are concentric to a center point of said plate.

In a further advantageous embodiment, said first pair of arc slots are equidistant from a center point of said plate.

In a further advantageous embodiment, said second pair of arc slots are equidistant from a center point of said plate.

In a further advantageous embodiment, said slots in at least one of said first and second portions allow an angle of connection in a vertical orientation of between 0-15°±.

The above objectives are further accomplished according to the present invention by providing a splice plate for adjustable angled connections between adjacent sections of cable bus enclosures, said splice plate comprising a first portion for adjustably connecting to a first siderail of a first cable bus enclosure; a plurality of slots included in said first portion for receiving connecting bolts to interconnect said first siderail and said plate, wherein said connecting bolts are movable within said slots so that an angle of connection between said plate and said first siderail is selectively adjustable in a vertical orientation by changing the position of said connecting bolts in said slots; a second portion for adjustably connecting to a second siderail of an adjacent second cable bus enclosure; a plurality of slots included in said second portion for receiving connecting bolts to interconnect said second siderail and said plate, wherein said connecting bolts are movable within said slots so that the connection between said plate and said second siderail is selectively adjustable in a horizontal orientation by changing the position of said connecting bolts in said slots; and, a hinge portion interconnecting said first and second portions, said hinge portion including a hinge member providing a horizontal pivotal movement; whereby an angle of connection between said first and second cable bus enclosures is selectively adjustable in both a vertical orientation and a horizontal orientation by changing the position of said connecting bolts in said slots on at least one of said first and second portions of said plate.

In a further advantageous embodiment, said slots in at least one of said first and second portions and said hinge member allow an angle of connection in at least one of a vertical orientation and a horizontal orientation of between 0-15°±.

In a further advantageous embodiment, said plurality of slots of said first portion include a straight slot for receiving a connecting bolt to interconnect said first siderail and said plate, and wherein said straight slot extend perpendicular to a central horizontal axis of said plate with a midpoint of said straight slot located along said central horizontal axis.

In a further advantageous embodiment, said plurality of slots of said first portion include at least one arc slot for receiving a connecting bolt to interconnect said first siderail and said plate, and said arc slot having a constant radius of curvature.

In a further advantageous embodiment, said plurality of slots in said first portion of said plate cooperate to allow for movement of said connecting bolts in said slots such that raising the angle of connection raises the position of said connecting bolts in each of said slots, and lowering the angle of connection lowers the position of said connecting bolts in each of said slots.

In a further advantageous embodiment, said plurality of slots in said second portion include a series of vertically spaced slots extending parallel to each other and parallel to a horizontal axis of said plate.

In a further advantageous embodiment, the splice plate includes a series of fixed mounting holes for receiving said connecting bolts in a fixed arrangement interconnecting said second siderail.

The above objectives are further accomplished according to the present invention by providing a splice plate for adjustable angled connections between adjacent sections of cable bus enclosures, said splice plate comprising a first portion for adjustably connecting to a first siderail of a first cable bus enclosure, and a second portion for connecting to a second siderail of an adjacent second cable bus enclosure; at least one straight slot included in said first portion for receiving a connecting bolt to interconnect said first siderail and said plate, wherein a position of said connecting bolt within said straight slot is movable to allow changes of connection angle; at least one arc slot included in said first portion for receiving connecting bolts to interconnect said first siderail and said plate, wherein a position of said connecting bolts within said arc slot is movable to allow changes of connection angle in cooperation with said straight slot; whereby an angle of connection between said first and second cable bus enclosures is selectively adjustable by changing the position of said connecting bolts in said slots on said first portion of said plate.

In a further advantageous embodiment, said slots cooperate to allow for movement of said connecting bolts in said slots such that raising the angle of connection raises the position of said connecting bolts in each of said slots on said first portion, and lowering the angle of connection lowers the position of said connecting bolts in each of said slots on said first portion.

BRIEF DESCRIPTION OF THE DRAWINGS

The system designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of preferred embodiments and not restrictive of the invention or other alternate embodiments of the invention. While the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below. Such objects, features, benefits and advantages will be apparent from the above in conjunction with the accompanying figures and all reasonable inferences to be drawn therefrom.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Figure 1:
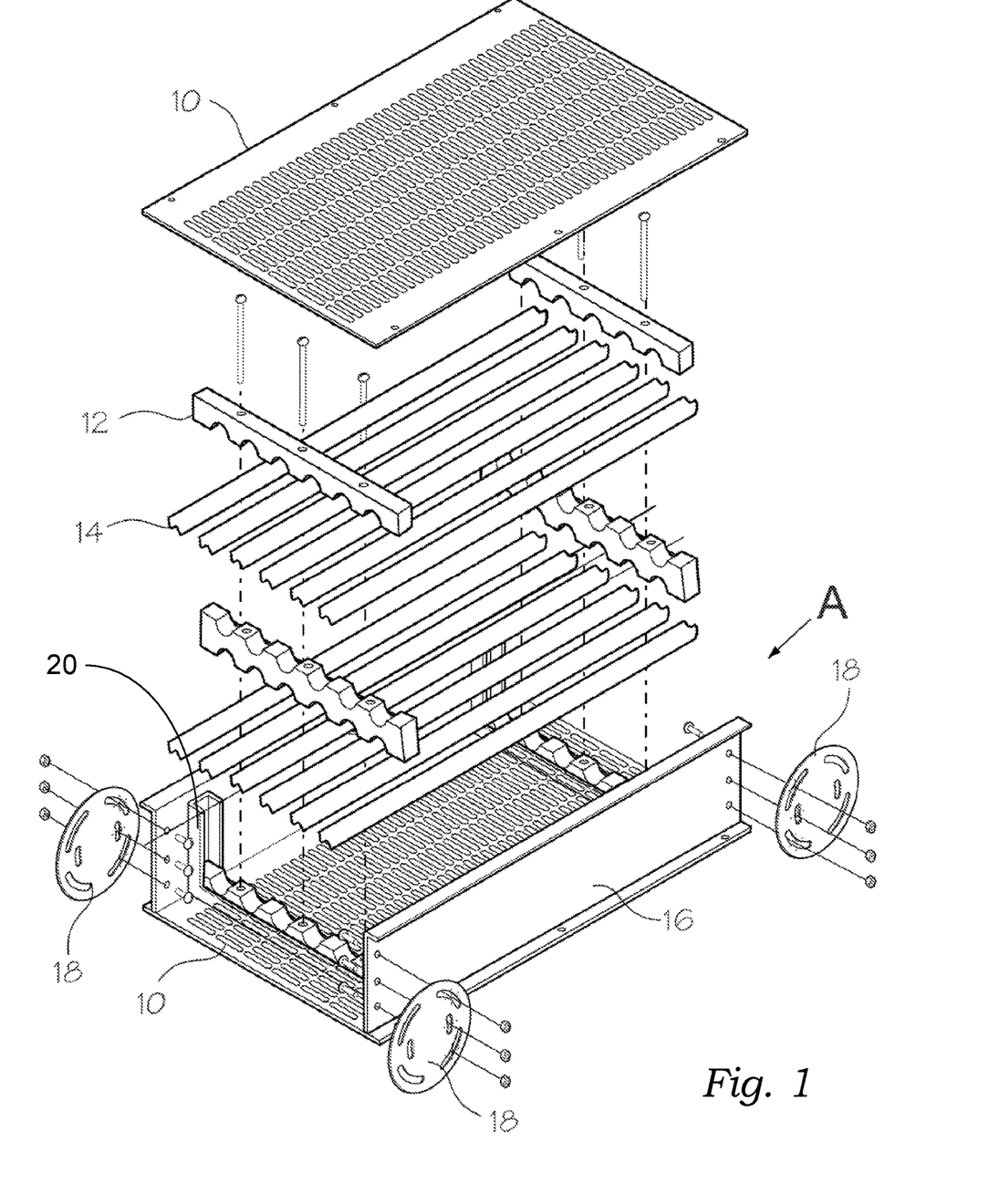
FIG. 1 shows an exploded view of a cable bus enclosure according to the present invention.
Figure 3:
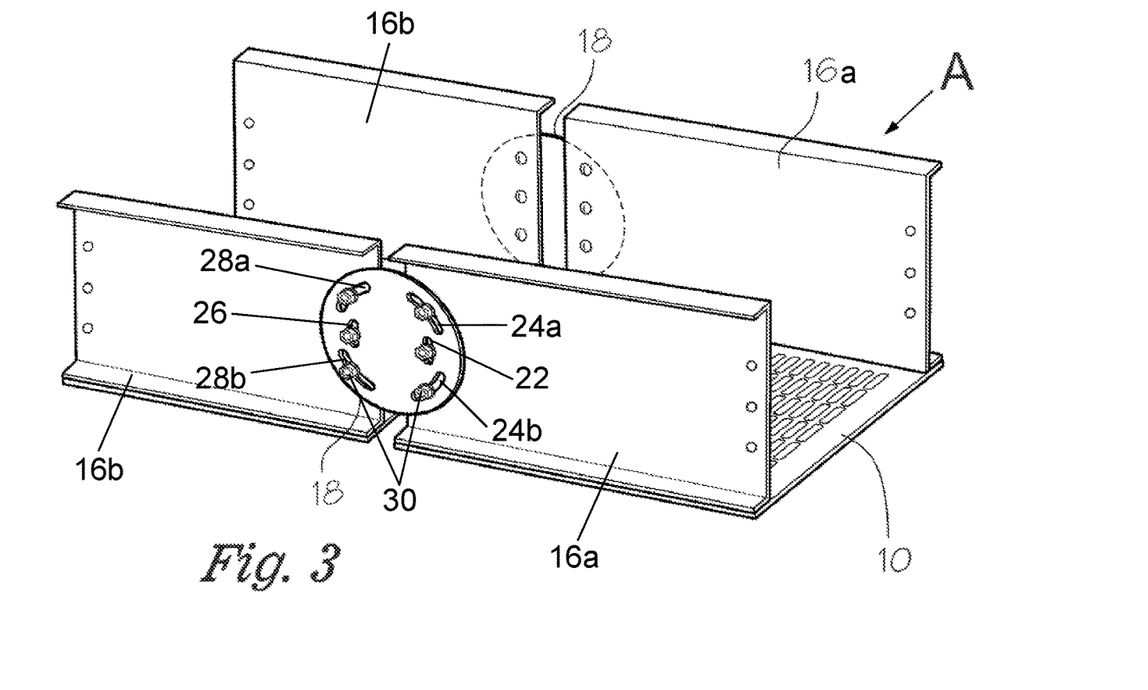
FIG. 3 show a perspective view of the splice plates of FIG. 2 interconnecting adjacent cable bus enclosures with selectively adjustable angled connections along a vertical orientation according to the present invention.

Referring to FIG. 1, in a basic arrangement, one section of a cable bus enclosure, designated generally as A, is shown. Preferably, the enclosure is made of aluminum and includes ventilated enclosure covers 10 on the top and bottom that are mounted to siderails 16. Cable support blocks 12 are carries in short-circuit braces 20, which support the insulated power cables 14. Uniform spacing is maintained by support blocks 12. Support blocks 12 are made from either hardwood such as maple, or high density polyethene. With further reference to FIG. 3, splice plates 18 mount to distal end portions of siderails 16 to interconnect adjacent sections of cable bus enclosure.

Figure 2:
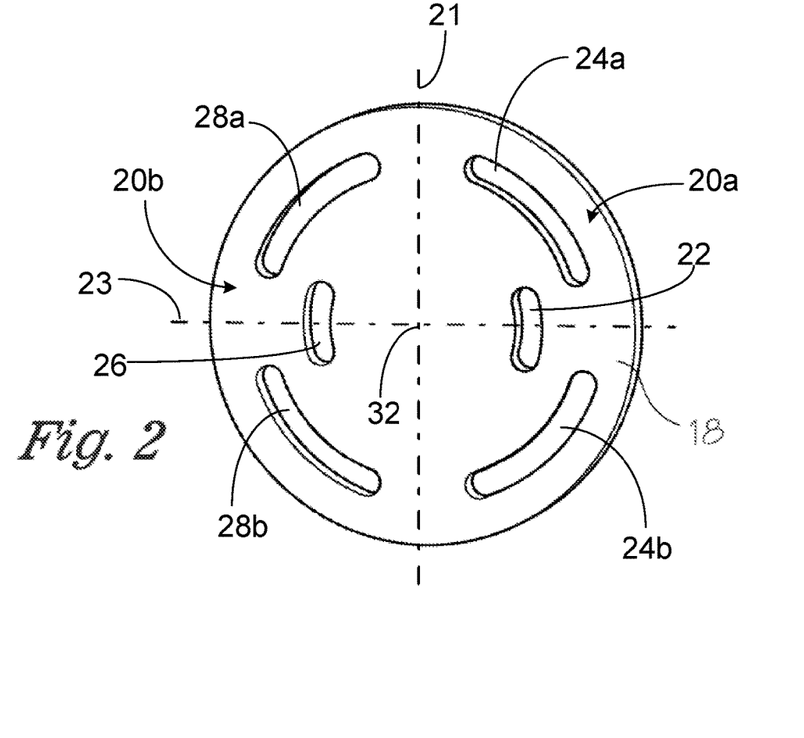
FIG. 2 shows a perspective view of a splice plate for adjustable angled connections along a vertical orientation according to the present invention.

Referring to FIGS. 2 and 3, a splice plate 18 is shown for adjustable angled connections between adjacent sections of cable bus enclosures. In the illustrated embodiment, splice plate 18 includes a first portion, designated generally as 20a, for adjustably connecting to a first siderail 16a of a first cable bus enclosure, and a second portion, designated generally as 20b, for adjustably connecting to a second siderail 16b of an adjacent second cable bus enclosure. First and second portions 20a and 20b are defined on opposite sided of a central vertical axis, designed as dotted line 21.

A first straight slot 22 is included in first portion 20a for receiving a connecting bolt 30 to interconnect first siderail 16a and splice plate 18. The position of connecting bolt 30 within first straight slot 22 is movable to allow changes of connection angle between the first and second siderails 16a and 16b.

A first pair of arc slots 24a and 24b are also included in first portion 20a, which each receive a connecting bolt 30 to interconnect first siderail 16a and splice plate 18. The position of connecting bolts 30 within the first pair of arc slots 24a and 24b is movable to allow changes of connection angle between first and second siderails 16a and 16b in conjunction with first straight slot 22.

A second straight slot 26 is included in second portion 20b for receiving a connecting bolt 30 to interconnect second siderail 16b and splice plate 18. The position of connecting bolt 30 within second straight slot 26 is movable to allow changes of connection angle between the first and second siderails 16a and 16b.

A second pair of arc slots 28a and 28b are included in second portion 20b which each receive a connecting bolt 30 to interconnect second siderail 16b and splice plate 18. The position of connecting bolts 30 within the second pair of arc slots 28a and 28b is movable to allow changes of connection angle between first and second siderails 16a and 16b in conjunction with second straight slot 26.

Accordingly, an angle of connection between adjacent first and second cable bus enclosures is selectively adjustable by changing the position of connecting bolts 30 in the various slots on at least one of first and second portions 20a and 20b of splice plate 18. Further, by utilizing a single splice plate 18 on each side of the joint between adjacent cable bus enclosures, a relatively small gap is created between sections with less material as compared to the prior art in which two plates per side are pivotally connected to create a pivoting splice joint. Additionally, in the illustrated embodiment, the splice plate 18 according to the present invention uses six interconnecting bolts 30 per side for securely holding the splice plates 18 and siderails 16 in position once tight. The prior art by contrast, only pivots around a single bolt on each side, which is far less secure and allows for over pivoting of the cable bus enclosures which can overly bend the insulated power cables during installation, which can damage the cables. The various slots in splice plate 18 which receive the connecting bolts 30 allow for a limited range of movement between adjacent cable bus enclosures during installation to prevent damage from over pivoting and over bending the cables.

The splice plates that span adjoining sections of cable bus enclosures will be reinforced by using high-pressure connecting bolts 30 to ensure that structural integrity is maintained.

Referring to FIG. 2, in the illustrated embodiment, first and second straight slots 22 and 26 extend perpendicular to a central horizontal axis, designated as dotted line 23, of splice plate 18. Preferably, a midpoint of first and second straight slots 22 and 26 is located along central horizontal axis 23, while first and second straight slots 22 and 26 are also offset from central vertical axis 21.

Further, the first pair of arc slots on first portion 20a of splice plate 18 are arranged to define an upper arc slot 24a disposed above first straight slot 22, and a lower arc slot 24b disposed below first straight slot 22. The second pair of arc slots are arranged in the same manner on second portion 20b of slice plate 18. Thus, the second pair of arc slots are arranged to define an upper arc slot 28a disposed above second straight slot 22, and a lower arc slot 28b disposed below second straight slot 26.

In the illustrated embodiment of FIG. 2, first pair of arc slots 24a and 24b, as well as, second pair of arc slots 28a and 28b have a constant radius of curvature and are concentric to a center point, designated generally as 32, of splice plate 18. Preferably, first pair of arc slots 24a and 24b, as well as, second pair of arc slots 28a and 28b are equidistant from center point 32.

Figure 4A:
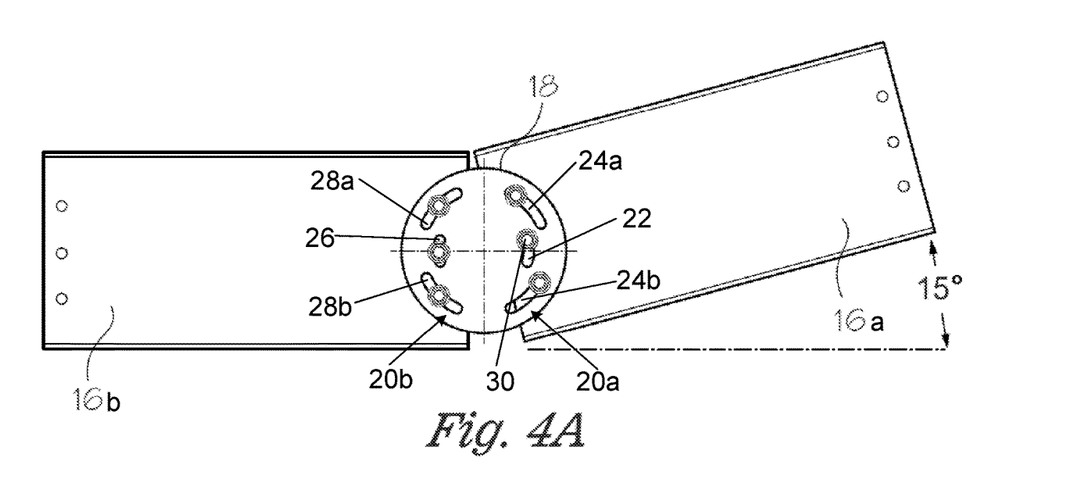
FIGS. 4A-4B show side views of the splice plate interconnecting adjacent cable bus enclosures at various angles along a vertical orientation according to the present invention.
Figure 4B:
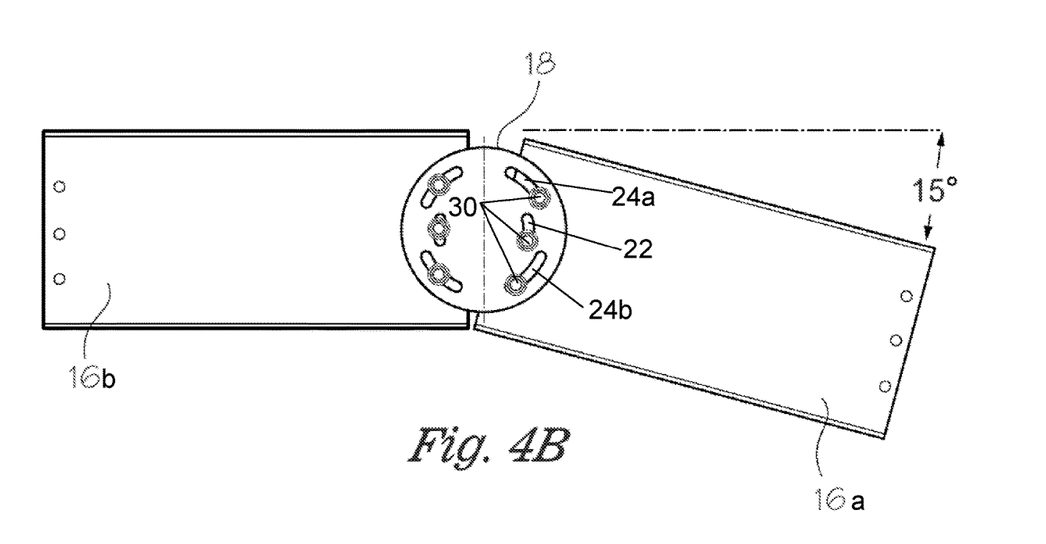

Together, the straight and arc slots in a given portion 20a and 20b of splice plate 18 cooperate to allow for a controlled limited movement of connecting bolts 30 in the respective slots. Referring to FIG. 4a, in operation, raising the angle of connection raises the position of connecting bolts 30 in each of said slots 22, 24a and 24b in the illustrated arrangement. The same applies to adjusting the opposite adjoining side, in which case, connecting bolts 30 would move upward in slots 26, 28a and 28b to raise the connection angle on the opposite side. Alternatively, referring to FIG. 4b, lowering the angle of connection lowers the position of connecting bolts 30 in each of the respective slots on at least one of first and second portion 20a and 20b depending on the side of the joint being adjusted. Because splice plate 18 does not operate on a central pivot point at center point 32, without straight slots 22 and 26 extending in a vertical orientation relative to central vertical axis 21, the connecting bolts would bind up and no adjustment angle could be created. Likewise, the limited adjustability of connecting bolts 30 within the straight and arc slots preferably allows for an angle of connection in a vertical orientation of between 0-15°±. Any adjustment beyond this requires a fixed angled section of cable bus enclosure to properly support and prevent damage to the insulated power cables.

Figure 5:
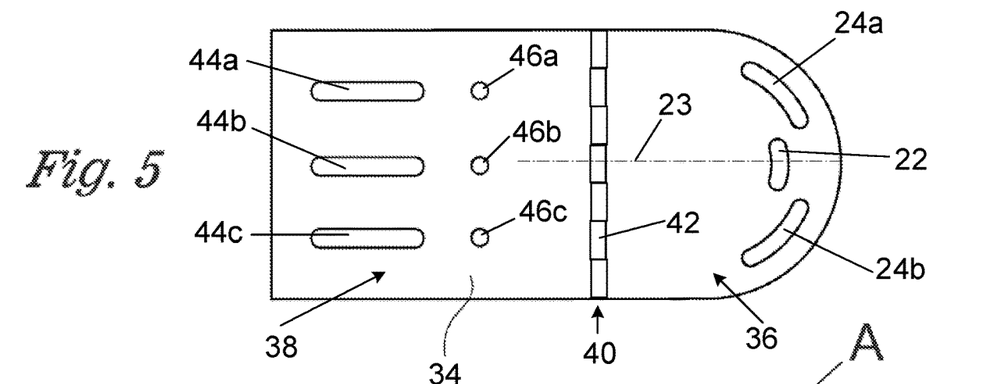
FIG. 5 shows a perspective view of an alternative embodiment of a splice plate for adjustable angled connections along a vertical and horizontal orientation according to the present invention; and, FIGS. 6A-6B show perspective views of the splice plate of FIG. 5 interconnecting adjacent cable bus enclosures at various angles along a vertical and horizontal orientation according to the present invention.
Figure 6A:
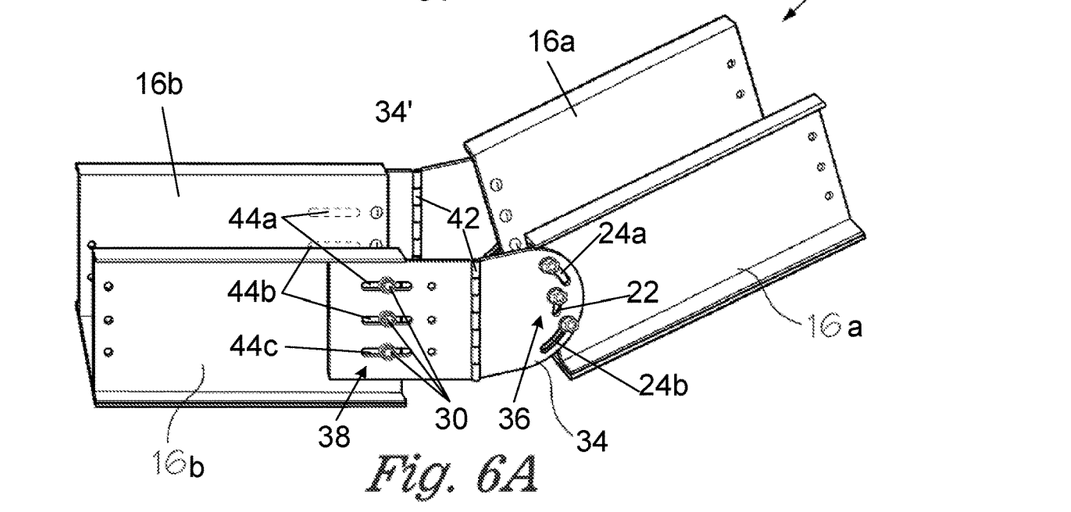
Figure 6B:
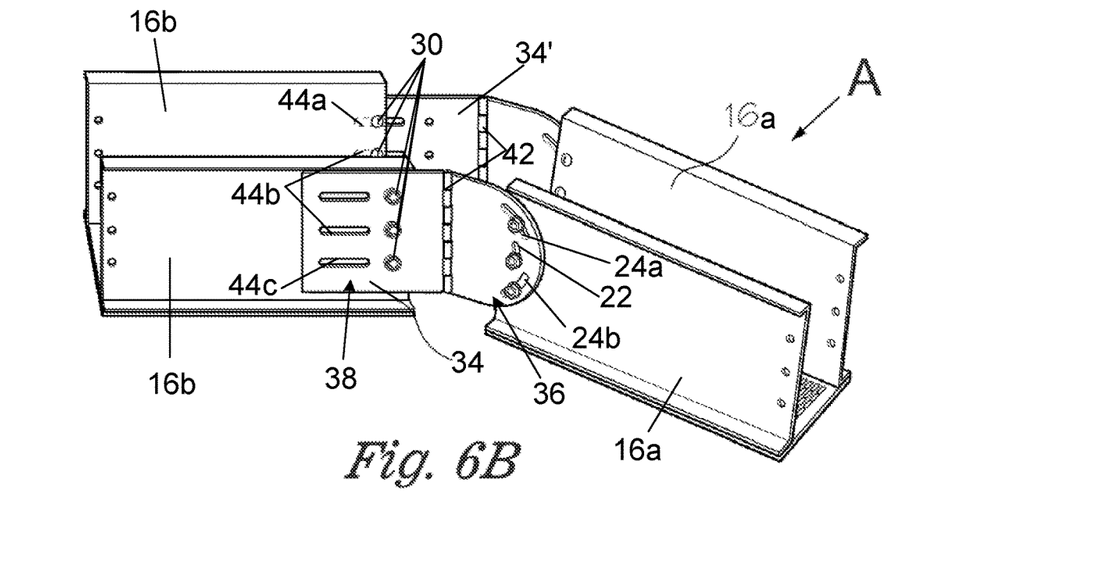

In a further embodiment, the splice plate can be constructed and arranged for allowing a change of connection angle not only in a vertical orientation as discussed above, but also in a horizontal orientation. Referring to FIGS. 5 and 6a-6b, in the illustrated embodiment, splice plate 34 includes a first portion, designated generally as 36, for adjustably connecting to a first siderail 16a of a first cable bus enclosure. First portion 36 is constructed and arranged with a plurality of slots that allow for adjustment of the connection angle in a vertical orientation. Splice plate 34 further includes a second portion, designated generally as 38, for adjustably connecting to a second siderail 16b of an adjacent second cable bus enclosure. Second portion 38 is constructed and arranged with a series of slots that allows for horizontal extension of splice plate 34 by providing lateral movement relative to second siderail 16b to accommodate connecting bolts 30 at various positions along the slots. A hinge portion, designated generally as 40, is disposed between first and second portions 36 and 38 and includes a hinge member 42 interconnecting the first and second portions 36 and 38 to allow for horizontal pivotal movement to adjustment the connection angle along a horizontal orientation.

Plurality of slots 22, 24a and 24b are included in first portion 36 for receiving connecting bolts 30 to interconnect first siderail 16a and splice plate 34. Connecting bolts 30 are movable within the slots so that an angle of connection between said plate and said first siderail is selectively adjustable in a vertical orientation by changing the position of connecting bolts the slots as detailed above regarding the embodiment of FIG. 2. As such, the plurality of slots in first portion 36 include a straight slot 22 that extends perpendicular to a central horizontal axis 23 of splice plate 34. In the illustrated embodiment, a midpoint of straight slot 22 is located along central horizontal axis 23.

The plurality of slots in first portion 36 are arranged with an upper arc slot 24a disposed above straight slot 22, and a lower arc slot 24b disposed below straight slot 22, each receiving a connecting bolt 30 to interconnect first siderail 16a and splice plate 34. Preferably, upper and lower arc slots 24a and 24b have a constant radius of curvature. Thus, the position of connecting bolts 30 within the arc slots 24a and 24b is movable to allow changes of connection angle between first and second siderails 16a and 16b in conjunction with straight slot 22 in a vertical orientation. Once the desired angle is selected, connecting bolts 30 are tightened to secure and hold the adjacent cable bus enclosures in position.

Together, the straight and arc slots in first portion 36 of splice plate 34 cooperate to allow for a controlled limited movement of connecting bolts 30 in the respective slots. Referring to FIG. 6a, in operation, raising the angle of connection raises the position of connecting bolts 30 in each of said slots 22, 24a and 24b in the illustrated arrangement. Alternatively, referring to FIG. 6b, lowering the angle of connection lowers the position of connecting bolts 30 in each of the respective slots in first portion 36. Without straight slot 22 extending in a vertical orientation, the connecting bolts 30 would bind up and no adjustment angle could be created. Likewise, the limited adjustability of connecting bolts 30 within the straight and arc slots preferably allows for an angle of connection in a vertical orientation of between 0-15°±. Any adjustment beyond this requires a fixed angled section of cable bus enclosure to properly support and prevent damage to the insulated power cables.

Plurality of horizontally extending slots 44a, 44b, and 44c in second portion 38 are provided for receiving connecting bolts 30 to interconnect second siderail 16b and splice plate 34, wherein connecting bolts 30 are movable within the slots so that the connection between said plate and said second siderail is selectively adjustable in a horizontal orientation by changing the position of said connecting bolts in slots 44a, 44b and 44c. In the illustrated embodiment, slots 44a, 44b and 44c are arranged as a series of vertically spaced slots extending parallel to each other and parallel to central horizontal axis 23.

In the illustrated embodiment, splice plate 34 further includes a series of fixed mounting holes 46a, 46b, and 46c vertically spaced and aligned for receiving connecting bolts 30 in a fixed arrangement for interconnecting with second siderail 16b.

Referring to FIGS. 6a and 6b, to adjust the connection angle along a horizontal orientation such that one section of cable bus enclosure is pivoted to the left (FIG. 6a) or to the right (FIG. 6b) of the adjoining cable bus enclosure, splice plate 34 must extend or contract horizontally relative to second siderail 16b along at least one side of the cable bus enclosure to allow for hinge member 42 to pivot.

Referring to FIG. 6a, siderails 16a are pivoted upward and to the right. The adjustment of the connection angle along the vertical orientation is provided for via slots 22, 24a, and 24b and the associated movement of connecting bolts 30 therein, as detailed herein above. The adjustment of the connection angle along the horizontal orientation to the right is provided for via hinge member 42 in combination with the horizontally extending slots 44a, 44b, and 44c. These slots allow for changing of the position of connecting bolts 30 such that splice plate 34 can move laterally to extend horizontally on a first side of the cable bus enclosure, while spice plate 34' remains in a fixed position relative to siderail 16b on a second side of the cable bus enclosure using mounting holes 46a, 46b, and 46c (or alternatively slots 44a, 44b, and 44c on splice plate 34'). As splice plate 34 is adjusted horizontally, hinge member 42 on splice plate 34 and 34' can then pivot to change the connection angle to the right. As shown in FIG. 6b, the process is reversed to change the connection angle to the left. Accordingly, an angle of connection between first and second cable bus enclosures is selectively adjustable in both a vertical orientation and a horizontal orientation by changing the position of connecting bolts 30 in the various slots.

Preferably, hinge member 42 and horizontally extending slots 44a, 44b, and 44c allow an angle of connection in a horizontal orientation of between 0-15°±.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A splice plate for adjustable angled connections between adjacent sections of cable bus enclosures, said splice plate comprising:
   a first portion for adjustably connecting to a first vertical siderail of a first cable bus enclosure, wherein said first cable bus enclosure includes a horizontally oriented based plate interconnecting a pair of vertically oriented siderails;
   a second portion for adjustably connecting to a second vertical siderail of an adjacent second cable bus enclosure, wherein said second cable bus enclosure includes a horizontally oriented based plate interconnecting a pair of vertically oriented siderails, and wherein said first and second vertical siderails each include a series of three vertically aligned apertures on a vertical surface of an end portion; said vertically aligned apertures defining an upper aperture, center aperture and lower aperture;
   a first center slot included in said first portion for receiving a connecting bolt that extends through said center aperture of said first siderail such that a position of the connecting bolt within said first center slot is vertically movable to allow changes of connection angle between said first and second siderails;
   a first pair of arc slots defining a first upper arc slot and a first lower arc slot included in said first portion, wherein said first upper arch slot receives a connecting bolt that extends through said upper aperture of said first siderail, and said first lower arc slot receives a connecting bolt that extends through said lower aperture of said first siderail, wherein a position of said connecting bolts within said first pair of arc slots is vertically movable to allow changes of connection angle between said first and second siderails;
   a second center slot included in said second portion for receiving a connecting bolt that extends through center aperture of said second siderail such that a position of the connecting bolt within second center slot is vertically movable to allow changes of connection angle between said first and second siderails; and,
   a second pair of arc slots defining a second upper arc slot and a second lower arc slot included in said second portion, wherein said second upper arch slot receives a connecting bolt that extends through said upper aperture of said second siderail, and said second lower arc slot receives a connecting bolt that extends through said lower aperture of said second siderail, wherein a position of said connecting bolts within said second pair of arc slots is vertically movable to allow changes of connection angle between said first and second siderails;
   whereby an angle of connection between said first and second cable bus enclosures is selectively adjustable by changing the position of the connecting bolts in said slots on at least one of said first and second portions of said plate.

2. The splice plate of claim 1 wherein said first and second center slots extend perpendicular to a central horizontal axis of said plate with a midpoint of said first and second center slots located along said central horizontal axis, and said first and second center slots being offset from a central vertical axis of said plate.

3. The splice plate of claim 1 wherein said slots cooperate to allow for movement of said connecting bolts in said slots such that raising the angle of connection vertically raises the position of said connecting bolts in each of said slots on at least one of said first and second portion, and lowering the angle of connection vertically lowers the position of said connecting bolts in each of said slots on at least one of said first and second portion.

4. The splice plate of claim 1 wherein said first pair of arc slots have a constant radius of curvature.

5. The splice plate of claim 1 wherein said second pair of arc slots have a constant radius of curvature.

6. The splice plate of claim 1 wherein said first pair of arc slots are concentric to a center point of said plate.

7. The splice plate of claim 1 wherein said second pair of arc slots are concentric to a center point of said plate.

8. The splice plate of claim 1 wherein said first pair of arc slots are equidistant from a center point of said plate.

9. The splice plate of claim 1 wherein said second pair of arc slots are equidistant from a center point of said plate.

10. The splice plate of claim 1 wherein said slots in at least one of said first and second portions allow an angle of connection in a vertical orientation of between 0-15°±.

11. The splice plate of claim 1 wherein said first and second center slots are straight vertically oriented slots.

12. The splice plate of claim 1 wherein said first and second center slots are curved vertically oriented slots.

13. The splice plate of claim 1 wherein said first and second center slots define a center pivot around which connecting bolts in said first and second pairs of arc slots move.

14. A splice plate for adjustable angled connections between adjacent sections of cable bus enclosures, said splice plate comprising:
   a first portion for adjustably connecting to a first vertical siderail of a first cable bus enclosure, and a second portion for connecting to a second vertical siderail of an adjacent second cable bus enclosure;
   at least one center slot included in said first portion for receiving a connecting bolt to interconnect said first siderail and said plate, wherein a position of said connecting bolt within said center slot is vertically movable to allow changes of connection angle;

at least one arc slot included in said first portion for receiving connecting bolts to interconnect said first siderail and said plate, wherein a position of said connecting bolts within said arc slot is vertically movable to allow changes of connection angle in cooperation with said center slot; and, wherein said center slot defines a center pivot around which said connecting bolt in said arc slot moves;

whereby an angle of connection between said first and second cable bus enclosures is selectively adjustable by changing the position of said connecting bolts in said slots on said first portion of said plate.

15. The splice plate of claim 14 wherein said slots cooperate to allow for movement of said connecting bolts in said slots such that raising the angle of connection vertically raises the position of said connecting bolts in each of said slots on said first portion, and lowering the angle of connection vertically lowers the position of said connecting bolts in each of said slots on said first portion.

* * * * *